United States Patent
Liotta et al.

(10) Patent No.: US 6,237,921 B1
(45) Date of Patent: May 29, 2001

(54) NESTED BRIDGE SEAL

(75) Inventors: Gary C. Liotta, Beverly; Elias H. Lampes, Lynnfield, both of MA (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/145,890

(22) Filed: Sep. 2, 1998

(51) Int. Cl.⁷ .................................................. F16J 15/02
(52) U.S. Cl. ........................ 277/630; 277/631; 277/644; 277/654
(58) Field of Search ..................... 277/628, 631, 277/626, 608, 644, 647, 654, 460, 630, 465, 485, 477

(56) References Cited

U.S. PATENT DOCUMENTS

| | | | |
|---|---|---|---|
| 499,266 | * 6/1893 | Voorhees | 277/631 |
| 1,151,112 | 8/1915 | Magarrell . | |
| 1,382,465 | 6/1921 | Bramberry . | |
| 1,447,533 | 3/1923 | Chopieska . | |
| 2,202,802 | * 5/1940 | Mason | 277/460 |
| 2,761,749 | * 9/1956 | Marien | 277/460 |
| 3,012,802 | * 12/1961 | Waite | 277/626 |
| 3,370,858 | * 2/1968 | Braendel | 277/460 |
| 4,063,845 | 12/1977 | Allen | 415/134 |
| 4,210,338 | * 7/1980 | Collings, Jr. | 277/485 |
| 4,218,067 | 8/1980 | Halling . | |
| 4,477,086 | * 10/1984 | Feder et al. | 277/647 |
| 4,602,795 | 7/1986 | Lillibridge . | |
| 4,759,555 | 7/1988 | Halling . | |
| 4,793,620 | * 12/1988 | Karch | 277/212 |
| 5,193,974 | * 3/1993 | Hufford | 277/75 |
| 5,249,814 | 10/1993 | Halling . | |
| 5,372,476 | 12/1994 | Hemmelgarn et al. . | |
| 5,716,052 | 2/1998 | Swensen et al. . | |
| 5,794,941 | * 8/1998 | Lahrman | 277/465 |

* cited by examiner

*Primary Examiner*—Anthony Knight
*Assistant Examiner*—Vishal Patel
(74) *Attorney, Agent, or Firm*—Andrew C. Hess; Nathan D. Herkamp

(57) ABSTRACT

A seal includes a seal ring with a circumferential split defining a gap. An arcuate bridge extends across the gap and nests in the seal ring. The bridge includes an anchor end which engages the seal ring solely in friction to restrain differential circumferential movement therebetween. The bridge also includes a slip end engaging the seal ring on an opposite side of the gap with less friction than the anchor end to permit differential circumferential movement therebetween.

20 Claims, 2 Drawing Sheets

NESTED BRIDGE SEAL

BACKGROUND OF THE INVENTION

The present invention relates generally to gas turbine engines, and, more specifically, to seals therein.

A gas turbine engine is an assembly of various stator and rotor components which require various types of seals to prevent undesirable leakage of either the hot combustion gases therein or compressed air.

Axially adjoining stator components typically use a ring seal compressed axially therebetween. The ring seal may be a complete 360° member, or it may be circumferentially split at one location for eliminating hoop loads and stresses therein. The split seal is radially elastic so that it may freely expand with an adjoining stator component without hoop restraint or stress therefrom. Ring seals are also axially elastic so that they may be initially axially compressed between the adjoining components for effecting a seal therebetween.

Ring seals may have various transverse cross-sectional configurations such as E-seals or W-seals for example. These shapes provide the required axial flexibility for effecting good seals around the circumference of the seal ring. However, the circumferential split interrupts the ring to form a gap which is a leakage site, although small.

Another version of the ring seal includes a circumferential segment which spans the circumferential gap to reduce or eliminate leakage thereat. Since this slip-seal includes two components, it is correspondingly more complex and expensive to manufacture. The seal segment must be suitably attached to the seal ring to span the circumferentially gap at all times. The segment is typically attached to the ring by welding which further adds to the design complexity and cost, and introduces corresponding heat affected zones. The welded joints are necessarily stress risers which must be accommodated for preventing excessive stress thereat which would undesirably reduce the life of the slip seal.

Accordingly, it is desired to improve slip seals for eliminating welding or other mechanical stress risers, and otherwise simplifying the design and manufacture thereof.

BRIEF SUMMARY OF THE INVENTION

A seal includes a seal ring with a circumferential split defining a gap. An arcuate bridge extends across the gap and nests in the seal ring. The bridge includes an anchor end which engages the seal ring solely in friction to restrain differential circumferential movement therebetween. The bridge also includes a slip end engaging the seal ring on an opposite side of the gap with less friction than the anchor end to permit differential circumferential movement therebetween.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
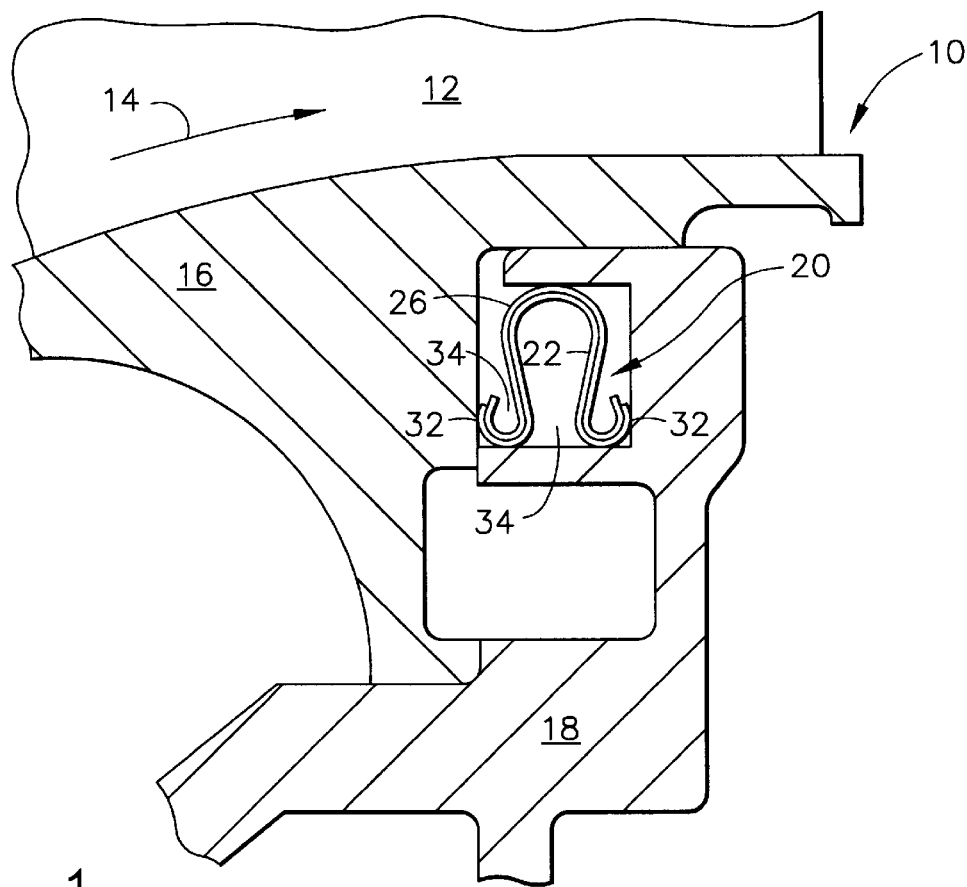
FIG. 1 is an enlarged, axial sectional view through a portion of a gas turbine engine turbine nozzle support including a nested bridge seal in accordance with,n exemplary embodiment of the present invention.

Illustrated in FIG. 1 is a portion of an exemplary high pressure turbine nozzle 10 of an aircraft gas turbine engine which may be sealed in accordance with the present invention. The nozzle includes a plurality of circumferentially spaced apart nozzle vanes 12, only the radially inner portion thereof being illustrated, which turn and accelerate hot combustion gases 14 received from an upstream combustor (not shown). The vanes are integrally attached to a radially inner band 16 which is in turn mounted to an annular supporting flange 18.

In order to sealingly join the nozzle inner band 16 to the support flange 18, an annular nested bridge seal 20 in accordance with a preferred embodiment of the invention is elastically axially compressed therebetween to reduce or prevent radial leakage there past.

The application of the seal 20 illustrated in FIG. 1 is just one of many which may be found in the gas turbine engine as conventionally known. The present invention is specifically directed to improvements in the seal 20 itself which is otherwise conventionally used at any suitable location in the gas turbine engine or other apparatus.

Figure 2:
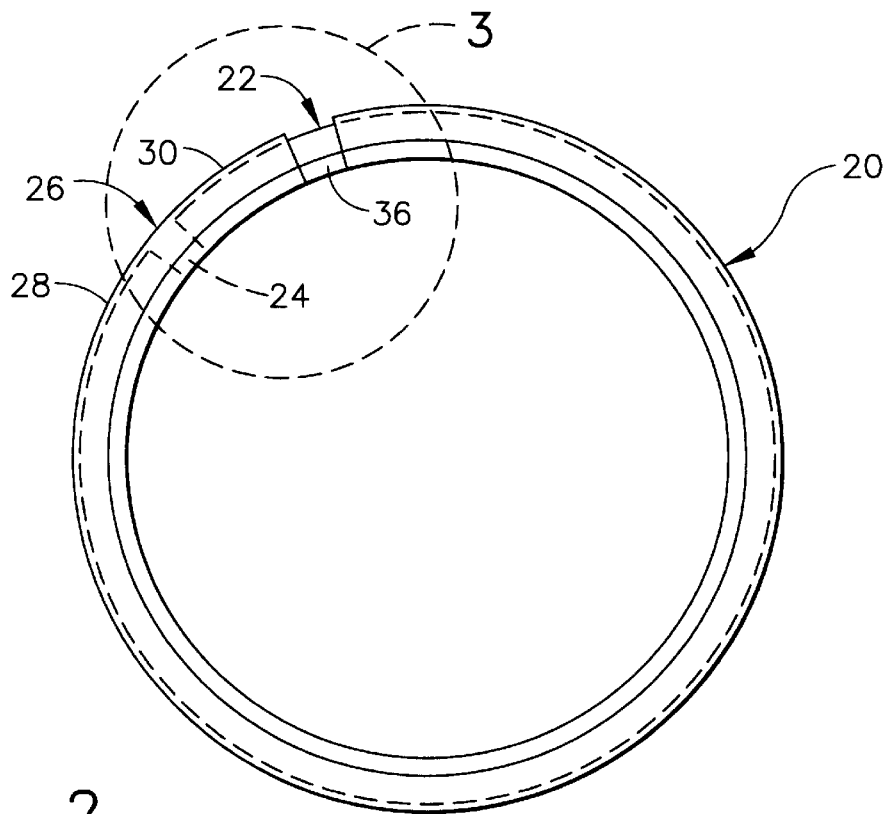
FIG. 2 is an elevational, end view of the bridge seal illustrated in FIG. 1 in isolation.

The seal 20 is shown installed in FIG. 1 and in isolation in FIG. 2, and is an assembly of components including a seal ring 22 having a single circumferential split defining a corresponding circumferential gap 24, and an arcuate bridge 26 extending circumferentially across the ring gap 24 to prevent leakage thereat. As shown in FIG. 1, the seal ring 22 has a serpentine transverse cross-section, and the bridge 26 has a complementary serpentine cross-section which may take any conventional form for sealing axially adjoining stator components.

Figure 3:
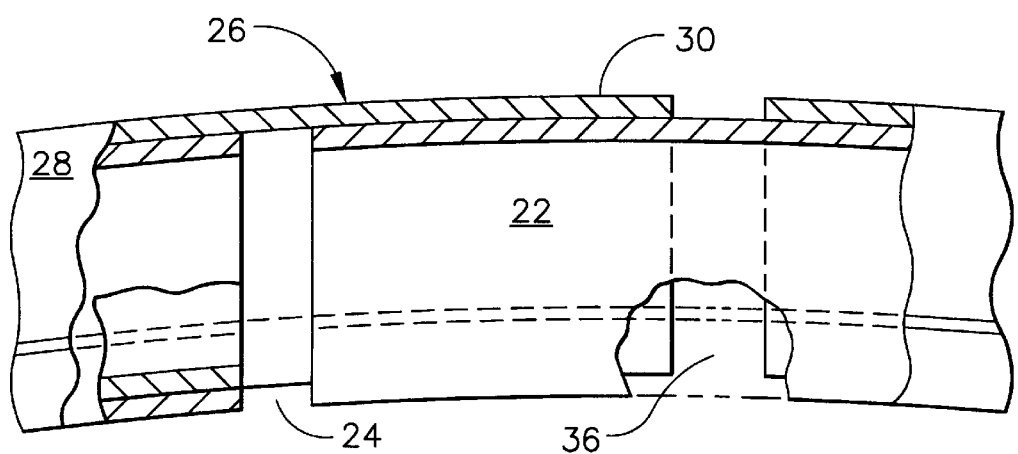
FIG. 3 is an enlarged, partly sectional view of the nested bridge and seal ring, and corresponding circumferential gaps thereof within the dashed circle labeled 3 in FIG. 2.

As shown in more detail in FIGS. 2 and 3, the bridge 26 includes a proximal or anchor end 28 which nests or circumferentially overlaps the seal ring 22 on one side of the gap 24. The bridge also includes an opposite distal or slip end 30 which also nests or circumferentially overlaps the seal ring 22 on an opposite side of the gap 24.

In accordance with the present invention, the bridge 26 engages the seal ring 22 solely in friction, with greater friction at the anchor end 28 to restrain or prevent differential circumferential movement therebetween, and less friction at the slip end 30 to permit substantially unrestrained differential circumferential movement therewith. The seal ring 22 itself may be configured to seal adjoining members in any conventional manner, with its circumferential gap 24 being closed by the bridge 26 to prevent leakage thereat. In this way, the bridge 26 provides a slip joint at the ring gap 24 permitting unrestrained expansion and contraction of the seal ring 22 while simultaneously sealing the gap 24.

Most significantly, no welding, brazing, or other mechanical connection is required between the ring 22. and the bridge 26 which would increase the complexity of the design and introduce undesirable stress risers associated therewith. The bridge and seal ring are simply joined together by their nested configuration using friction only.

As shown in FIG. 1, both the seal ring 22, and bridge 26 have complementary serpentine transverse cross-sections which are radially symmetrical, and elastically compressible there across in the axial direction between the adjoining inner band 16 and support flange 18 in a pocket therebetween specifically configured therefor.

The seal ring 22 and bridge 26 each have a pair of radially extending and axially opposite reverse bends 32 which collectively define the serpentine cross-section and provide sealing surfaces for contacting the adjoining members 16,18. The reverse bends 32 are defined by a plurality of radially open slots or grooves 34 to effect the axially elastically compressible cross-section. The seal 20 is therefore axially flexible, but radially rigid in cross-section due to the serpentine configuration which has a generally hat-shape.

The nested seal ring 22 and bridge 26 illustrated in FIG. 1 are preferably formed of thin gauge sheet metal nesting together in substantially identical serpentine cross-section. Sheet metal is flexible and may be readily formed in the serpentine shape illustrated in FIG. 1 using conventional equipment.

As shown in FIG. 2, the bridge anchor end 28 circumferentially overlaps or nests the seal ring with a greater extent than the bridge slip end 30 to frictionally secure the anchor end while allowing the slip end to slide relative to the seal ring under radial expansion and contraction.

In a preferred embodiment, the bridge anchor end circumferentially overlaps the seal ring greater than a quadrant, or quarter of circle, and the bridge slip end overlaps the seal ring less than a quadrant. Since the bridge 26 is attached to the seal ring solely by friction and the nested assembly thereof, it is undesirable to have excessive friction at the slip end 30 which would prevent the substantially unrestrained expansion and contraction of the seal ring with a corresponding increase and decrease in size of the end gap 24.

In the preferred embodiment illustrated in FIG. 2, the bridge 26 is in the form of a second full ring having a second circumferential split defining a bridge gap 36, shown in more detail in FIG. 3. In this configuration, the seal 20 is a two-ply construction with both the ring 22 and bridge 26 extending substantially 3600, but for the corresponding end gaps 24,36.

In this two-ply configuration, the bridge gap 36 is disposed circumferentially adjacent to the ring gap 24 within a single quadrant adjacent thereto: clockwise, as shown, or counterclockwise therefrom. In this way, the circumferential extent of the slip end 30 is relatively short between the two gaps 24,36 to ensure substantially unrestrained slip movement between the slip end 30 and the adjoining seal ring 22.

Correspondingly, the bridge anchor end 28 extends over at least three quadrants and a portion of the fourth quadrant for maximizing the frictional engagement with the seal ring to prevent differential circumferential movement therebetween during operation. The sole circumferential differential movement between the bridge and seal ring 22 occurs at the slip end 30.

The two-ply seal 20 may be readily manufactured using conventional equipment, with the seal ring 22 and bridge 26 being initially formed in serpentine section with their end gaps 24,36 being aligned with each other. Suitable circumferential force may then be applied to circumferentially rotate the ring and bridge relative to each other to circumferentially separate the end gaps 24,36 and complete a full ring nesting therebetween. However, since the seal 20 is loaded primarily in axial compression during operation, there is little if any circumferential force applied thereto which might change the relative circumferential position of the gaps 24,36.

Friction alone is sufficient for maintaining assembled the seal ring 22 and its bridge 26 while also permitting substantially unrestrained radial expansion and contraction of the seal for preventing the generation of undesirable stresses therein. And, since the ring 22 and bridge 26 are simply nested together without welding, brazing, or other mechanical discontinuity, the resulting assembly is relatively simple and free of stress risers which would otherwise affect its ultimate strength.

Figure 4:
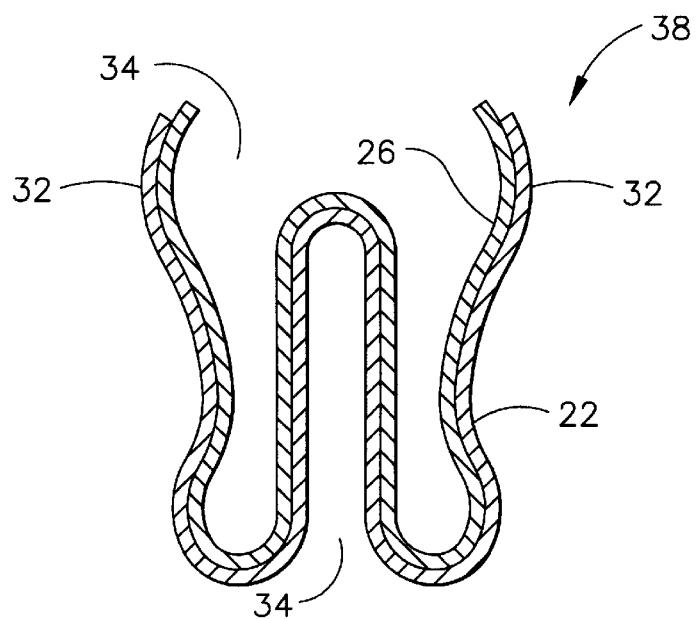
FIG. 4 a transverse cross-section of a nested bridge seal in accordance with an alternate embodiment of the present invention.

As indicated above, the seal 20 may have any conventional transverse section and still enjoy the benefits of friction nesting. For example, FIG. 4 illustrates an alternate embodiment of the seal, designated 38, having a transverse cross-section in the conventional form of an E or W. Although the transverse configuration of the seal 38 illustrated in FIG. 4 is slightly different than the configuration of the seal 20 illustrated in FIG. 1, the same reference numerals corresponding to the same parts are used including the seal ring 22 and bridge 26 defined by different versions of the reverse bends 32 and radial slots 34.

Whereas the ring gap 24 illustrated in FIG. 2 would be hidden within the bridge 26 for the seal 20, a corresponding ring gap for the seal 38 illustrated in FIG. 4 would be exposed. Correspondingly, the bridge gap 36 for the seal 20 illustrated in FIG. 2 is exposed, whereas the corresponding bridge gap for the seal 38 illustrated in FIG. 4 would be hidden by the seal ring 22.

In both embodiments, however, the seal ring 22 defines the outermost ply thereof which engages the corresponding portions of the inner band 16 and support flange 18 for effecting seals thereat. The corresponding bridges, in contrast, are provided for merely bridging the seal ring and gaps 24, and normally do not otherwise provide a seal with the adjoining band 16 and flange 18.

The seal ring 22 and bridge 26 may have any other suitable transverse configuration for effecting sealing, with these two components being retained together by friction-only to permit substantially unrestrained differential thermal expansion and contraction of the seal ring during operation.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

1. A seal comprising:
   a seal ring having a serpentine cross-section, and a circumferential split therethrough defining a gap;
   an arcuate bridge extending circumferentially across said gap, and having a serpentine cross-section being complementary with said seal ring for nesting an anchor end of said bridge with said seal ring on one side of said gap, and nesting in an opposite slip end of said bridge with said seal ring on an opposite side of the said gap; and
   said bridge engages said seal ring solely in friction, with said bridge anchor end circumferentially overlapping said seal ring greater than about a quadrant to effect greater friction at said anchor end to restrain differential circumferential movement, and with said bridge slip end circumferentially overlapping said seal ring less than about a quadrant to effect less friction at said slip end to permit differential circumferential movement.

2. A seal according to claim 1 wherein said seal ring and bridge are symmetrical in said serpentine cross-section, and elastically compressible there across.

3. A seal according to claim 2 wherein said seal ring includes a pair of reverse bends collectively defining said serpentine cross-section and providing sealing surfaces for adjoining members.

4. A seal according to claim 3 wherein said seal ring and bridge are sheet metal nesting together in substantially identical serpentine cross-section.

5. A seal according to claim 4 wherein said bridge comprises a ring having a circumferential split defining a bridge gap.

6. A seal according to claim 5 wherein said bridge gap is disposed within a quadrant of said ring gap.

7. A seal according to claim 2 wherein said bridge comprises a ring having a circumferential split defining a bridge gap.

8. A seal according to claim 7 wherein said bridge gap is disposed circumferentially adjacent to said ring gap.

9. A seal according to claim 8 wherein said bridge gap is disposed within a quadrant of said ring gap.

10. A seal according to claim 9 wherein said seal ring and bridge include a plurality of radially open slots to effect said elastically compressible cross-section.

11. A seal comprising a pair of split rings nested together solely in friction to bridge respective end gaps thereof, and circumferentially overlapping each other greater than about a quadrant at respective anchor ends thereof to effect greater friction at said anchor ends to restrain differential circumferential movement, and circumferentially overlapping each other less than about a quadrant at respective bridge ends thereof to effect less friction at said bridge ends to permit differential circumferential movement.

12. A seal according to claim 11 wherein said rings have complemenetary serpentine cross-sectioned.

13. A seal according to claim 12 wherein said rings are symmetrical in said serpentine cross-section, and elastically compressible thereacross.

14. A seal according to claim 13 wherein said rings include a pair of reverse bends collectively defining said serpentine cross-sections and providing sealing surfaces for adjoining members.

15. A seal according to claim 14 wherein said end gaps are circumferentially located in a single quadrant.

16. A seal according to claim 13 wherein one of said end gaps is hidden with the ring of the other end gap.

17. A seal for sealing two gas turbine engine stator members comprising:

a seal ring having a serpentire cross-section, and a circumferential split therethrough defining a gap; and an arcuate bridge extending circumferentially across said gap, and including circumferentially opposite anchor and slip ends nesting in said seal ring solely in friction, with said bridge anchor end circumferentially overlapping said seal ring greater than about a quadrant to effect greater friction at said anchor end to restrain differential circumferential movement, and with said bridge slip end circumferentially overlapping said seal ring less than about a quadrant to effect less friction at said slip end to permit differential circumferential movement.

18. A seal according to claim 17 wherein said seal ring and bridge are symmetrical in serpentine cross-section, and elastically compressible thereacross.

19. A seal according to claim 18 wherein said seal ring includes a pair of reverse bends collectively defining said serpentine cross-section and providing sealing surfaces for said adjoining members.

20. A seal according to claim 19 wherein said bridge and ring are sheet metal, and said bridge comprises a ring having a circumferential split defining a bridge gap disposed within a quadrant of said ring gap.

* * * * *